United States Patent
Tsai et al.

(10) Patent No.: US 7,497,606 B1
(45) Date of Patent: Mar. 3, 2009

(54) REFLECTIVE REAR LIGHT FOR A TRUCK

(75) Inventors: Hsi-Hsien Tsai, Tainan (TW); Ko-Chun Pan, Tainan (TW)

(73) Assignee: Lucidity Enterprise Co., Ltd., An-Nan District, Tainan (TW)

(*) Notice: Subject to any disclaimer, the term of this patent is extended or adjusted under 35 U.S.C. 154(b) by 22 days.

(21) Appl. No.: 11/898,805

(22) Filed: Sep. 17, 2007

(51) Int. Cl.
*F21V 7/00* (2006.01)

(52) U.S. Cl. ...................... 362/516; 362/545

(58) Field of Classification Search .......... 362/545, 362/516, 540, 543
See application file for complete search history.

(56) References Cited

U.S. PATENT DOCUMENTS

| | | | |
|---|---|---|---|
| 6,814,475 B2 * | 11/2004 | Amano | 362/487 |
| 6,883,945 B1 * | 4/2005 | Gonzalez | 362/485 |
| 7,401,959 B2 * | 7/2008 | Kogo et al. | 362/540 |
| 7,401,960 B2 * | 7/2008 | Pond et al. | 362/545 |
| 2003/0147253 A1 * | 8/2003 | Shy | 362/545 |
| 2008/0031004 A1 * | 2/2008 | Chu | 362/545 |

* cited by examiner

*Primary Examiner*—Ali Alavi

(57) ABSTRACT

A reflective rear light for a truck includes a light housing, a reflection plate and a lens. The light housing is formed integrally with a circuit board provided thereon with a clearance light and side marker light region. The reflection plate is provided with a side reflecting plate corresponding to the clearance light and side marker light region on the circuit board. The lens has one side disposed with a side light transmission region having its front side provided with a clearance light refraction region, having one inner side equipped with a slot at a location near the side light transmission region for fitting a side reflector with a side light refraction region. The truck rear light is disposed with several different warning light regions to illuminate a license plate and reinforcing effect of projecting light on the truck width and side.

1 Claim, 4 Drawing Sheets

REFLECTIVE REAR LIGHT FOR A TRUCK

BACKGROUND OF THE INVENTION

1. Field of the Invention

This invention relates to a reflective rear light for a truck, particularly to one composed of a light housing, a reflection plate and a lens. The light housing is formed integrally with a circuit board disposed thereon with a clearance light and side marker light region. The reflection plate consists of a side reflecting plate corresponding to the clearance light and side marker light region of the light housing. The lens has one side formed with a side light transmission region having its front side provided with a clearance light refraction region. The lens further has one inner side provided with a slot at a location near the side marker light transmission region for fitting a side reflector that is provided with a side light refraction region. By this design, the reflective rear light for a truck of this invention can be divided into several different warning light regions, not only able to illuminate a license plate but also reinforce an effect of projecting light on the truck width and side.

2. Description of the Prior Art

A conventional truck rear light, as shown in FIG. 1, includes a base (A1) having its front and lower side respectively combined with a back-up lens (A30), a main lens (A20) and a license plate lens (A40). A main light housing (A2) is installed inside the housing (A1), corresponding to the back-up lens (A30), and a license plate light housing (A4) is disposed at a rear lower side of the main light housing (A2), corresponding to the license plate lens (A40). A side light housing (A5) having one side covered with a side lens (A50) is installed at the exterior side of the housing (A1). Thus, the conventional truck rear light has functions of a brake light, a taillight, a back-up light, a directional light and a license plate light. Although the construction of the conventional truck rear light can provide different warning functions, yet the main light housing (A2), the reverse light housing (A3), the license plate light housing (A4) and the side light housing (A5) are respectively mounted with their own LED circuit boards; therefore, it is troublesome and complicated in manufacturing and assembling the components and hard to recognize the width of a truck. In addition, the conventional truck rear light illuminated only by light transmission is insufficient in brightness.

SUMMARY OF THE INVENTION

The objective of this invention is to offer a reflective rear light for a truck formed integrally and divided into several different warning light regions to illuminate a license plate and reinforce effect of projecting light on truck width and side.

The truck rear light in the present invention includes a light housing formed integrally with a circuit board installed thereon with lots of LEDs and divided into a main light region, a clearance light and side marker light region and plural license plate light regions. The light housing is further fixed thereon with a positioning post. A reflection plate to be screwed together with the light housing consists of a main reflecting plate, plural license plate reflecting plates and a side reflecting plate, equipped with a threaded hole to be combined with the positioning post of the light housing. A lens to be covered on the light housing is disposed with a main light projection region, plural license plate transmission regions and a side light transmission region having its front side provided with a clearance light refraction region. The lens further has one inner side provided with a slot at a location near the side light transmission region for fitting a side reflector that is provided thereon with a side light refraction region.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
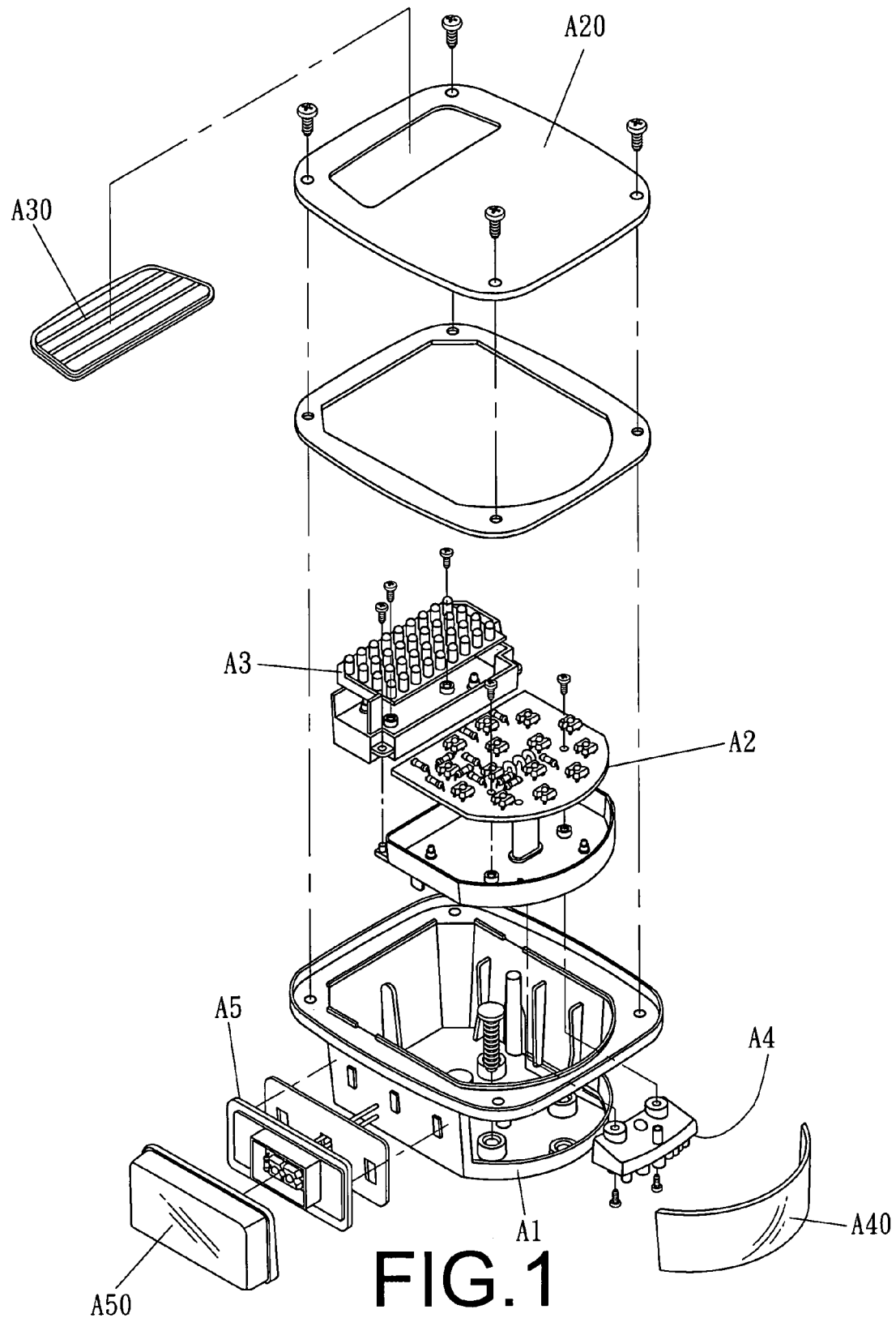
FIG. 1 is an exploded perspective view of a conventional truck rear light.
Figure 2:
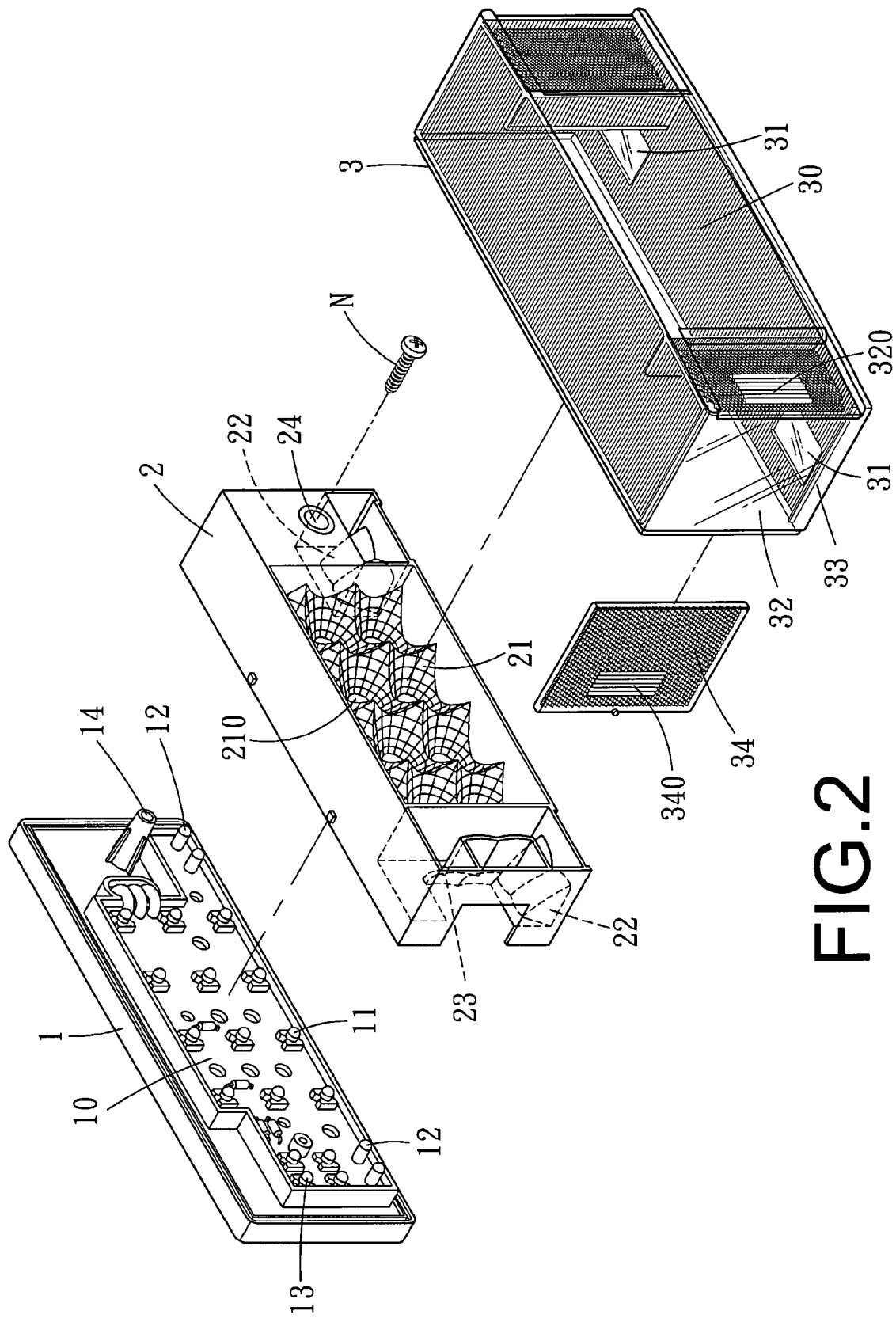
FIG. 2 is an exploded perspective view of a reflective rear light for a truck in the present invention.
Figure 3:
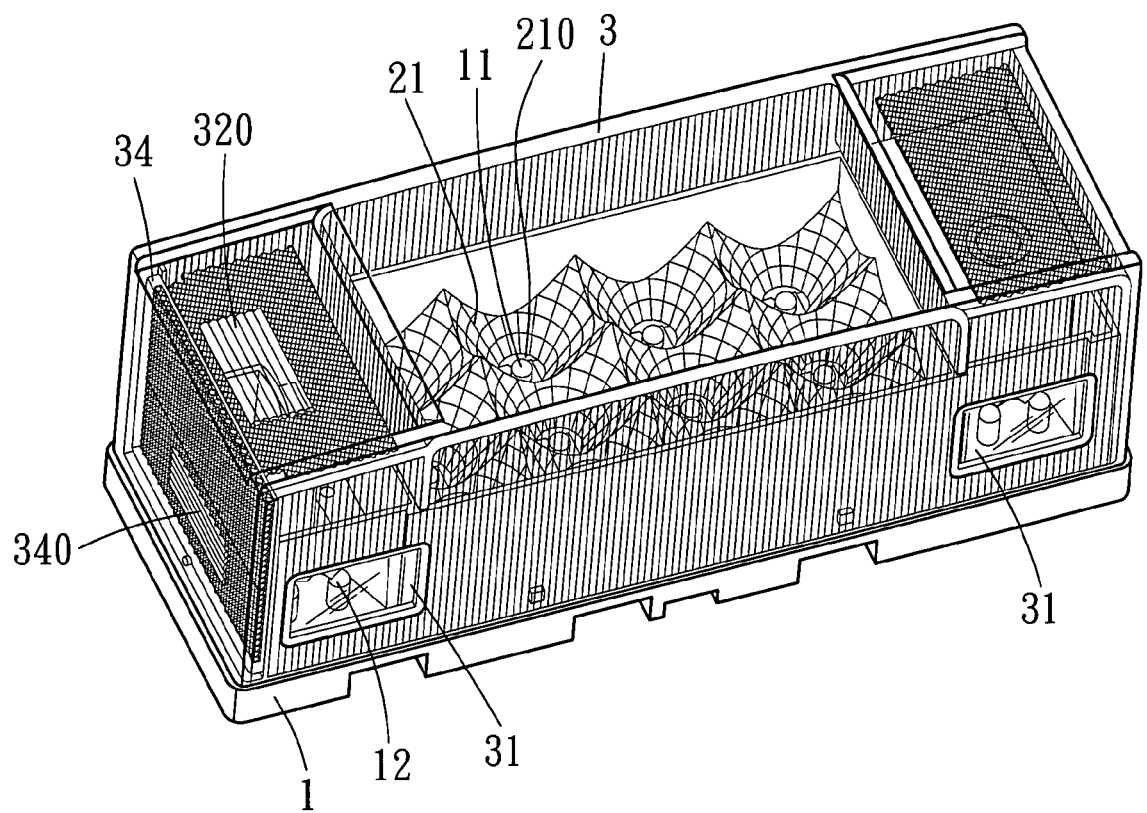
FIG. 3 is a perspective view of the reflective rear light for a truck in the present invention.
Figure 4:
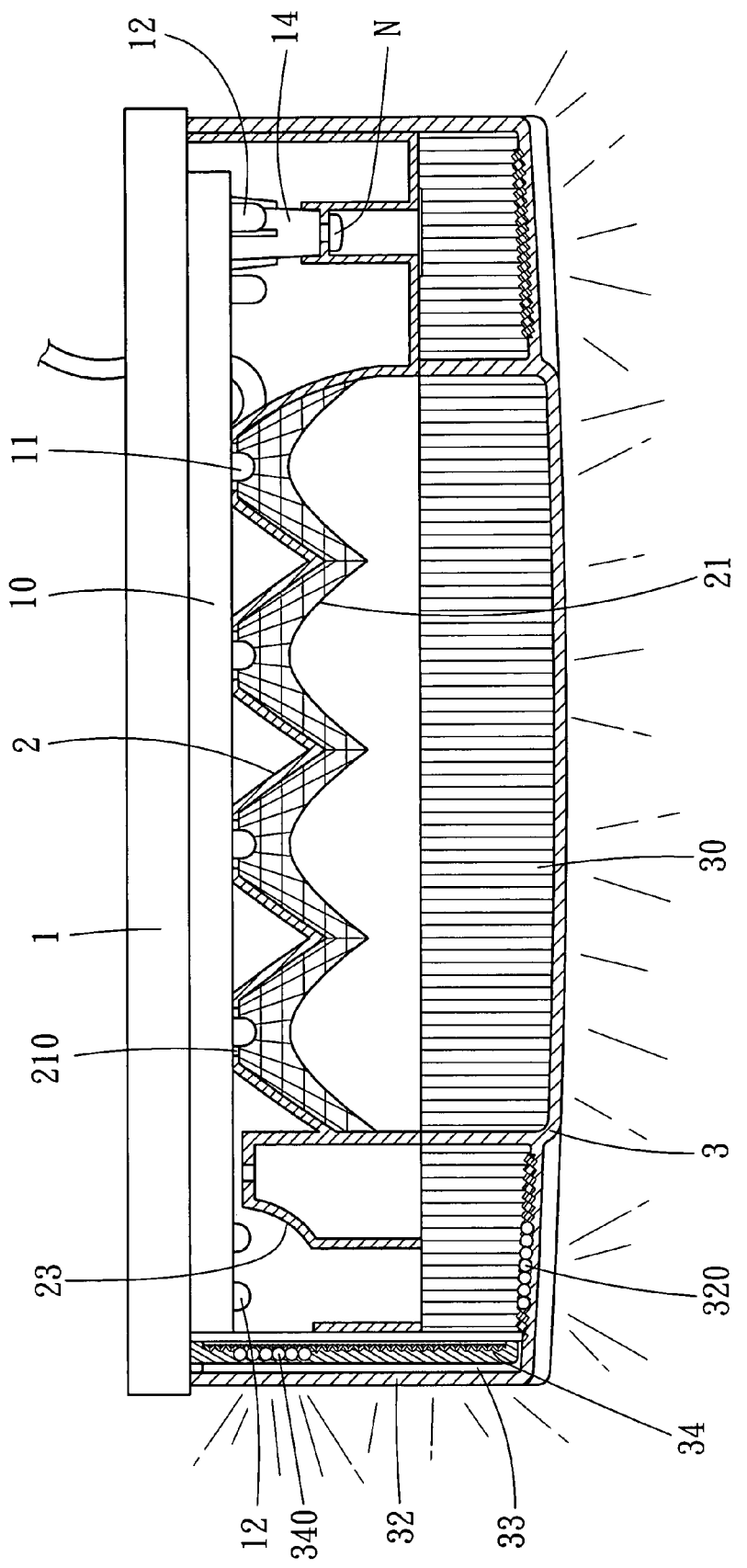
FIG. 4 is a cross-sectional view of the reflective rear light for a truck in the present invention.

A preferred embodiment of a reflective rear light for a truck in the present invention, as shown in FIGS. 2, 3 and 4, includes a light housing 1, a reflection plate 2 and a lens 3 as main components combined together.

The light housing 1 has a rectangular shape and is formed integrally with a circuit board 10 installed thereon with lots of LEDs and divided into a main light region 11, plural license plate light regions 12 and a clearance light and side marker light region 13. The light housing 1 is further fixed thereon with a positioning post 14.

The reflection plate 2 to be screwed together with the light housing 1 consists of three isolated chambers which are a middle chamber and two side chambers aside two sides of the main chambers; a main reflecting plate 21 receiving in the main chamber, plural license plate reflecting plates 22 and a side reflecting plate 23 which are received in the two side chambers. The reflection plate 2 is equipped with a threaded hole 24 to be combined with the positioning post 14 of the light housing 1 by means of a screw (N). The main reflecting plate 21 is disposed with a plurality of recessed holes 210 corresponding to the main light region 11. The license plate reflecting plates 22 are respectively positioned at the lower opposite sides of the main reflecting plate 21, corresponding to the license plate light regions 12 on the circuit board 10. The side reflecting plate 23 is positioned near the exterior side of the main reflecting plate 21 at a location matching with the clearance light and side marker light region 13 on the circuit board 10. The main reflecting plate 21 has a three-dimensional wavelike shape.

The lens 3 to be covered on the light housing 1 is provided with a main light projection region 30, two license plate light transmission regions 31 and a side light transmission region 32 having its front side disposed with a clearance light refraction region 320. Further, the lens 3 has one inner side provided with a slot 33 at a location near the side light transmission region 32. A side reflector 34 provided thereon with a side light refraction region 340 is inserted in the slot 33 of the lens 3.

In assembling, referring to FIGS. 2, 3 and 4, firstly, the reflection plate 2 is covered on the circuit board 10 of the light housing 1. At this time, the LEDs on the main light region 11 are respectively extended out of the recessed holes 210 of the main reflecting plate 21, and the main reflecting plate 21, the license plate reflecting plates 22 and the side reflecting plate 23 of the reflection plate 2 are respectively aligned to the main light region 11, the license plate light regions 12 and the clearance light and side marker light region 13 on the circuit board 10, and the threaded hole 24 of the reflection plate 2 is also aligned to the positioning post 14 of the light housing 1. Next, the screw (N) is inserted through the threaded hole 24 and then secured with the positioning post 14 to combine the light housing 1 and the reflection plate 2 together. Lastly, the side reflector 34 is inserted in the slot 33 of the lens 3 and then the lens 3 is covered and secured on the light housing 1, letting the main light projection region 30, the license plate light transmission regions 31 and the side light transmission region 32 respectively aligned to the main light region 11, the license plate light regions 12 and the clearance light and side marker light region 13 of the light housing 1, thus finishing the assembly of the reflective rear light for a truck.

With this design, the reflective rear light for a truck of this invention has the following advantages.

1. The main light region 11, the license plate light regions 12 and the clearance light and side marker light region 13 of the light housing 1 in cooperation with the main reflecting plate 21, the license plate reflecting plates 22 and the side reflecting plate 23 of the reflection plate 2 can function to divide illumination.

2. The integral circuit board 10 is installed thereon with lots of LEDs divided into several different warning light regions and having a large-area refraction effect with the help of the reflection plate 2.

3. The side reflector 34 inserted in one side of the lens 3 enables the clearance light to reinforce its reflection effect by refraction of both the clearance light refraction region 320 at the front side of the side light transmission region 32 and the side light refraction region 340 at one side of the side reflector 34, thus increasing light illumination area and reinforcing effect in recognizing the truck width and side signals.

While the preferred embodiment of the invention has been described above, it will be recognized and understood that various modifications may be made therein and the appended claims are intended to cover all such modifications that may fall within the spirit and scope of the invention.

What is claimed is:

1. A reflective rear light for a truck comprising: a light housing, a reflection plate and a lens; wherein
   the light housing has a rectangular shape and is formed integrally with a circuit board installed thereon with lots of LEDs and divided into a main light region, plural license plate light regions and a clearance light and side marker light region; the light housing is further fixed thereon with a positioning post;
   the reflection plate to be screwed together with the light housing consists of three isolated chambers which are a middle chamber and two side chambers aside two sides of the main chambers; a main reflecting plate receiving in the main chamber, plural license plate reflecting plates and a side reflecting plate which are received in the two side chambers; the reflection plate is equipped with a threaded hole to be combined with the positioning post of the light housing by means of a screw; the main reflecting plate is disposed with a plurality of recessed holes corresponding to the main light region; the license plate reflecting plates are respectively positioned at the lower opposite sides of the main reflecting plate, corresponding to the license plate light regions on the circuit board; the side reflecting plate positioned near the exterior side of the main reflecting plate at a location matching with the clearance light and side marker light region on the circuit board; the main reflecting plate has a three-dimensional wavelike shape the lens to be covered on the light housing is provided with a main light projection region, two license plate light transmission regions and a side light transmission region having its front side disposed with a clearance light refraction region; the lens has one inner side provided with a slot at a location near the side light transmission region; a side reflector provided thereon with a side light refraction region is inserted in the slot of the lens; and
   wherein in assembling, the reflection plate is covered on the circuit board (10) of the light housing; the LEDs on the main light region are respectively extended out of the recessed holes of the main reflecting plate, and the main reflecting plate, the license plate reflecting plates and the side reflecting plate of the reflection plate are respectively aligned to the main light region, the license plate light regions and the clearance light and side marker light region on the circuit board, and the threaded hole of the reflection plate is also aligned to the positioning post of the light housing; next, the screw is inserted through the threaded hole and then secured with the positioning post to combine the light housing and the reflection plate together; lastly, the side reflector is inserted in the slot of the lens and then the lens is covered and secured on the light housing, letting the main light projection region, the license plate light transmission regions and the side light transmission region respectively aligned to the main light region, the license plate light regions and the clearance light and side marker light region of the light housing, thus finishing the assembly of the reflective rear light for a truck.

* * * * *